(12) United States Patent
Leigh et al.

(10) Patent No.: US 10,534,138 B2
(45) Date of Patent: Jan. 14, 2020

(54) MODULE BOARD COUPLING

(71) Applicant: Hewlett Packard Enterprise Development LP, Houston, TX (US)

(72) Inventors: Kevin B. Leigh, Houston, TX (US); Sunil Ganta, Cypress, TX (US); John Norton, Houston, TX (US); George D. Megason, Spring, TX (US)

(73) Assignee: Hewlett Packard Enterprise Development, Houston, TX (US)

( * ) Notice: Subject to any disclaimer, the term of this patent is extended or adjusted under 35 U.S.C. 154(b) by 0 days.

(21) Appl. No.: 16/068,094

(22) PCT Filed: Dec. 22, 2015

(86) PCT No.: PCT/US2015/067409
§ 371 (c)(1),
(2) Date: Jul. 3, 2018

(87) PCT Pub. No.: WO2017/111947
PCT Pub. Date: Jun. 29, 2017

(65) Prior Publication Data
US 2019/0018199 A1 Jan. 17, 2019

(51) Int. Cl.
*G02B 6/36* (2006.01)
*G02B 6/42* (2006.01)
*H04B 10/40* (2013.01)

(52) U.S. Cl.
CPC ............ *G02B 6/36* (2013.01); *G02B 6/4246* (2013.01); *G02B 6/4261* (2013.01); *G02B 6/4269* (2013.01); *G02B 6/4284* (2013.01); *G02B 6/4292* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 3,556,382 A | 1/1971 | Busler et al. | |
| 3,786,454 A | 1/1974 | Lissner et al. | |
| 3,964,098 A | 6/1976 | Kramer et al. | |
| 3,973,273 A | 8/1976 | Lissner et al. | |
| 4,022,370 A | 5/1977 | Durney | |
| 7,712,969 B2 * | 5/2010 | Song | G02B 6/4261 385/53 |
| 7,974,098 B2 | 7/2011 | Oki et al. | |

(Continued)

FOREIGN PATENT DOCUMENTS

| | | |
|---|---|---|
| CN | 203631825 | 6/2014 |
| CN | 204230541 | 3/2015 |
| JP | 2006-228701 | 8/2006 |

OTHER PUBLICATIONS

PCT/ISA/KR, International Search Report and Written Opinion, dated Jul. 29, 2016, PCT/US2015/067409, 13 pages.

*Primary Examiner* — Tina M Wong
(74) *Attorney, Agent, or Firm* — Brooks, Cameron & Huebsch, PLLC

(57) ABSTRACT

In one example, a system for a module board coupling includes a module bracket coupled to a plate, a module board coupled to the plate, a number of frame pins coupled to the module frame to slide under the plate when a back spring coupled to the module bracket is depressed, wherein the module board is engaged with a socket when the number of frame pins slide under the plate.

13 Claims, 4 Drawing Sheets

(56) References Cited

U.S. PATENT DOCUMENTS

| | | | |
|---|---|---|---|
| 8,104,977 B2* | 1/2012 | Sone | H04B 10/40 |
| | | | 385/139 |
| 8,358,504 B2 | 1/2013 | McColloch et al. | |
| 8,416,570 B2 | 4/2013 | Zeng et al. | |
| 9,052,477 B2* | 6/2015 | Oki | G02B 6/4284 |
| 9,709,763 B2* | 7/2017 | Wang | G02B 6/4292 |
| 2002/0193062 A1 | 12/2002 | Abe et al. | |
| 2003/0141090 A1 | 7/2003 | Kruger et al. | |
| 2003/0171022 A1* | 9/2003 | Distad | G02B 6/4261 |
| | | | 439/372 |
| 2005/0289569 A1 | 12/2005 | Jung et al. | |
| 2006/0093287 A1 | 5/2006 | Yoshikawa et al. | |
| 2007/0041687 A1* | 2/2007 | Mizue | G02B 6/4277 |
| | | | 385/92 |
| 2007/0119328 A1 | 5/2007 | Maglio et al. | |
| 2007/0212149 A1 | 9/2007 | Ota | |
| 2009/0016685 A1* | 1/2009 | Hudgins | H04B 10/40 |
| | | | 385/92 |
| 2009/0321301 A1* | 12/2009 | Song | G02B 6/4201 |
| | | | 206/701 |
| 2012/0023510 A1 | 1/2012 | Ogawa | |
| 2012/0269486 A1* | 10/2012 | Ishii | G02B 6/4246 |
| | | | 385/92 |
| 2013/0210275 A1 | 8/2013 | Fish et al. | |
| 2015/0180578 A1 | 6/2015 | Leigh et al. | |
| 2019/0018199 A1* | 1/2019 | Leigh | G02B 6/4246 |

* cited by examiner

MODULE BOARD COUPLING

BACKGROUND

Computing systems can include a system board with a number of socket connectors to couple module boards to the system board. The module boards can be hot-pluggable transceiver modules. The hot-pluggable transceiver modules, such as 1-lane Small Form Factor Pluggable (SFP), 4-lane Quad Small Form Factor Pluggable (QSFP), and 12-Lane CXP, can be used for network data communications. The transceiver modules can be hot-pluggable to the system board, such as a printed circuit board of a switch module. A system board can be behind a faceplate where connectors for coupling communication cables (e.g., fiber optic cables) to the transceiver modules are arranged.

DETAILED DESCRIPTION

A number of examples for a module board coupling are described herein. In one example, a system for a module board coupling includes a module bracket coupled to a plate, a module board coupled to the plate, a number of frame pins coupled to the module frame to slide under the plate when a back spring coupled to the module bracket is depressed, wherein the module board is engaged with a socket when the number of frame pins slide under the plate. As described herein, a number of plate springs can direct the plate and module board to engage with the socket. In another example, a module board coupling includes a plate coupled to a module board, wherein the plate includes a number of grooves, a number of frame pins coupled to the module board coupling, a back spring to position the number of frame pins within the number of grooves, a plate spring coupled to the plate to vertically position the module board when the number of frame pins are within the number of grooves.

The module board coupling described herein can provide blind mate coupling of a module board to a system board with a relatively smaller volume space compared to previous systems and methods. The module board coupling described herein can utilize a module bracket and a plate coupled to the module board to interact with a cage coupled to the system board. The module board coupling can provide substantially horizontal insertion of the module board with a substantially vertical installation of the module board to the system board. As used herein, "substantially horizontal" includes a direction that is more horizontal to the system board than vertical and "substantially vertical" includes a direction that is more vertical to the system board than horizontal.

Figure 1:
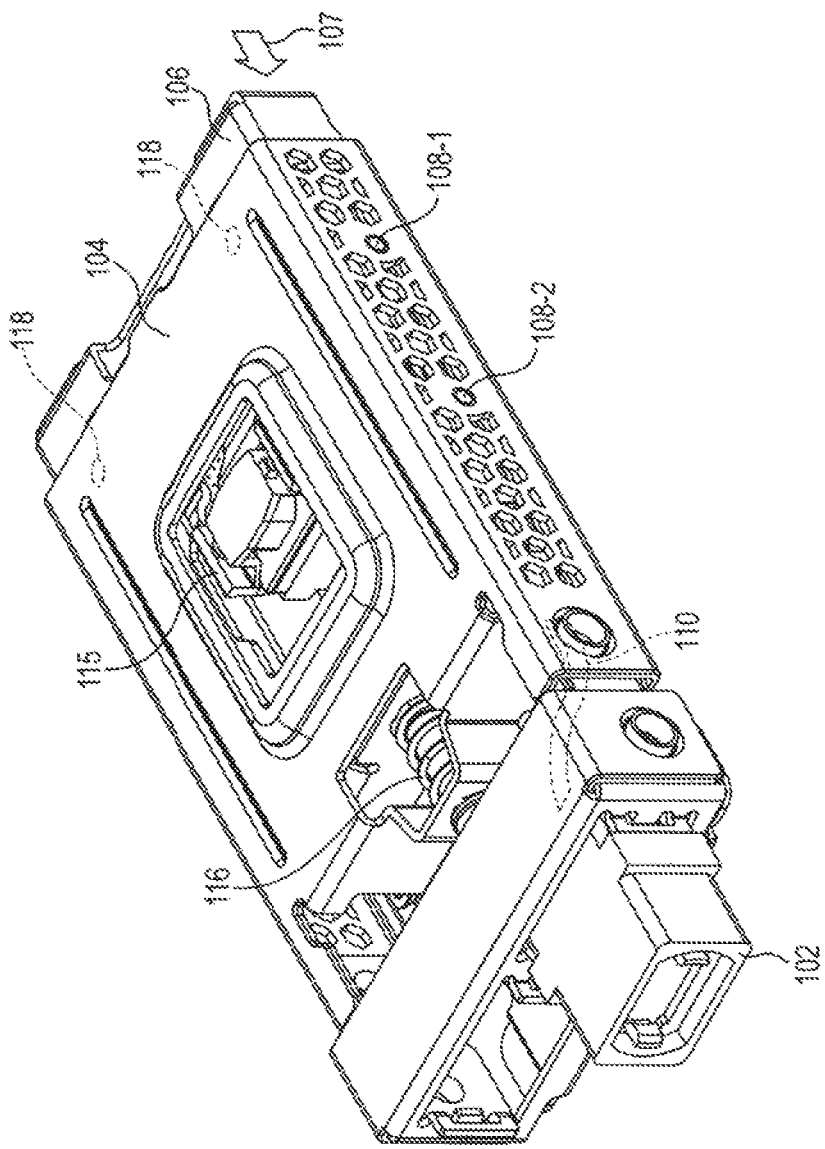
FIG. 1 illustrates a diagram of an example of a system for a module board coupling consistent with the present disclosure.

FIG. 1 illustrates a diagram of an example of a system 100 for a module board coupling consistent with the present disclosure. The system 100 can be utilized to couple a module board (under module frame) to a system board (not shown). In some examples, the module board can be a hot-pluggable transceiver module. In some examples, the module board can include an optical transceiver to enable a relatively higher faceplate optical connector density. The system 100 can provide for substantially horizontal installation with the system board when the module board is installed by a substantially vertical coupling with the system board.

The system 100 can include a module frame 104. In some examples, the module frame 104 can enclose the module board. In some examples, the module frame 104 can enclose a top portion of the module board while exposing a number of connections on a bottom portion of the module board. In some examples, the module frame 104 can also expose an optical transceiver 115 on a top portion of the module board.

In some examples, the module frame 104 can be coupled to a module bracket 106. The module bracket 106 can move within the module frame 104. For example, the module bracket 106 can slide from a first position (e.g., disengaged position, a position when module board is not coupled to the system board, etc.) to a second position (e.g., engaged position, a position when module board is coupled to the system board, etc.) within the module bracket 106. In this example, the second position can be a position where the module bracket 106 is more within the module frame 104 than the first position. In some examples, the module bracket 106 can be moved within the module frame 104 by applying pressure to an end of the module bracket 106. For example, pressure can be applied at position 107 to move the module bracket 106 further into the module frame 104.

In some examples, the module bracket 106 can be coupled to a back spring 116. The back spring 116 can provide resistance when pressure is applied at position 107. In some examples, the back spring 116 can apply pressure to the module bracket 106 when the module board is removed from the system board. In some examples, the back spring 116 can move the module bracket 106 from an engaged position to a disengaged position. In some examples, the back spring 116 can be utilized to move the module bracket 106 between a plurality of positions within the module frame 104.

In some examples, the system can include a plate that is coupled to the module board and to the module bracket 106. In some examples, the plate can be coupled to the module bracket 106 by a number of plate springs 118. In some examples, the number of plate springs 118 can apply pressure on the plate. In some examples, the plate springs 118 can be utilized to apply pressure on the plate to move the module board in a substantially vertical direction to lower the module board to a system board.

In some examples, the module frame 104 can include a number of frame pins 108-1, 108-2. In some examples, the number of frame pins 108-1, 108-2 can include stakes that can be coupled to the module frame 104. In some examples, the number of frame pins 108-1, 108-2 can be positioned between the module board and the plate. In some examples, the number of frame pins 108-1, 108-2 can be stationary pins that are coupled to the module frame 104. In some examples, the number of frame pins 108-1, 108-2 can be utilized to control when the number of plate springs 118 lower the module board to a system board. In some examples, the number of frame pins 108-1, 108-2 can include bushings or a coating material to enable the plate to pass over the number of frame pins 108-1, 108-2 more easily.

In some examples, the plate can include a number of grooves (e.g., inverted grooves, v-grooves, etc.). In some examples, the number of grooves can be utilized to receive the number of frame pins 108-1, 108-2. In some examples, the plate and the module board can be lowered in a substantially vertical direction to the system board when the number of frame pins 108-1, 108-2 are received by the number of grooves. For example, the number of frame pins 108-1, 108-2 can be received by the number of grooves when pressure is applied to the module bracket 106 at position 107. In this example, the number of grooves can allow the number of plate springs 118 to lower the plate and the module board to the system board in a substantially vertical direction to the system board.

The system 100 can include an optical connector 102. In some examples, the optical connector 102 can provide connection and disconnection of a computing device to the module board. In some examples, the optical connector 102 can provide an optical fiber connection between a computing device and the module board. In some examples, the optical connector 102 can be coupled to the module board by an optical jumper 110. In some examples, the optical jumper 110 can be an optical cable that is physically coupled to the optical connector 102 and the module board.

In some examples, the system 100 can include a cable manager. In some examples, the cable manager can prevent the optical jumper 110 that couples the module board to the optical connector 102 is not over extended or becomes decoupled from the module board or the optical connector 102. In some examples, an additional cable manager (not shown) can be positioned on an opposite side of the system 100 to prevent a different optical jumper from being disconnected.

In some examples, the system 100 can include a latch to lock the system 100 to a cage that is coupled to the system board. In some examples, the latch can lock the system 100 to the cage when the module board is coupled to the system board. In some examples, the latch can also be utilized to remove the module board from the system board. For examples, the latch can be a spring loaded latch that can be depressed to remove the system 100 from the cage.

As described herein, the system 100 can be utilized to couple the module board to a system board. In some examples, the system 100 can be utilized as a blind mate coupling of the module board to the system board. In some examples, the system 100 can be utilized provide a substantially vertical coupling of the module board to the system board with a substantially horizontal insertion of the system 100 into a cage.

Figure 2:
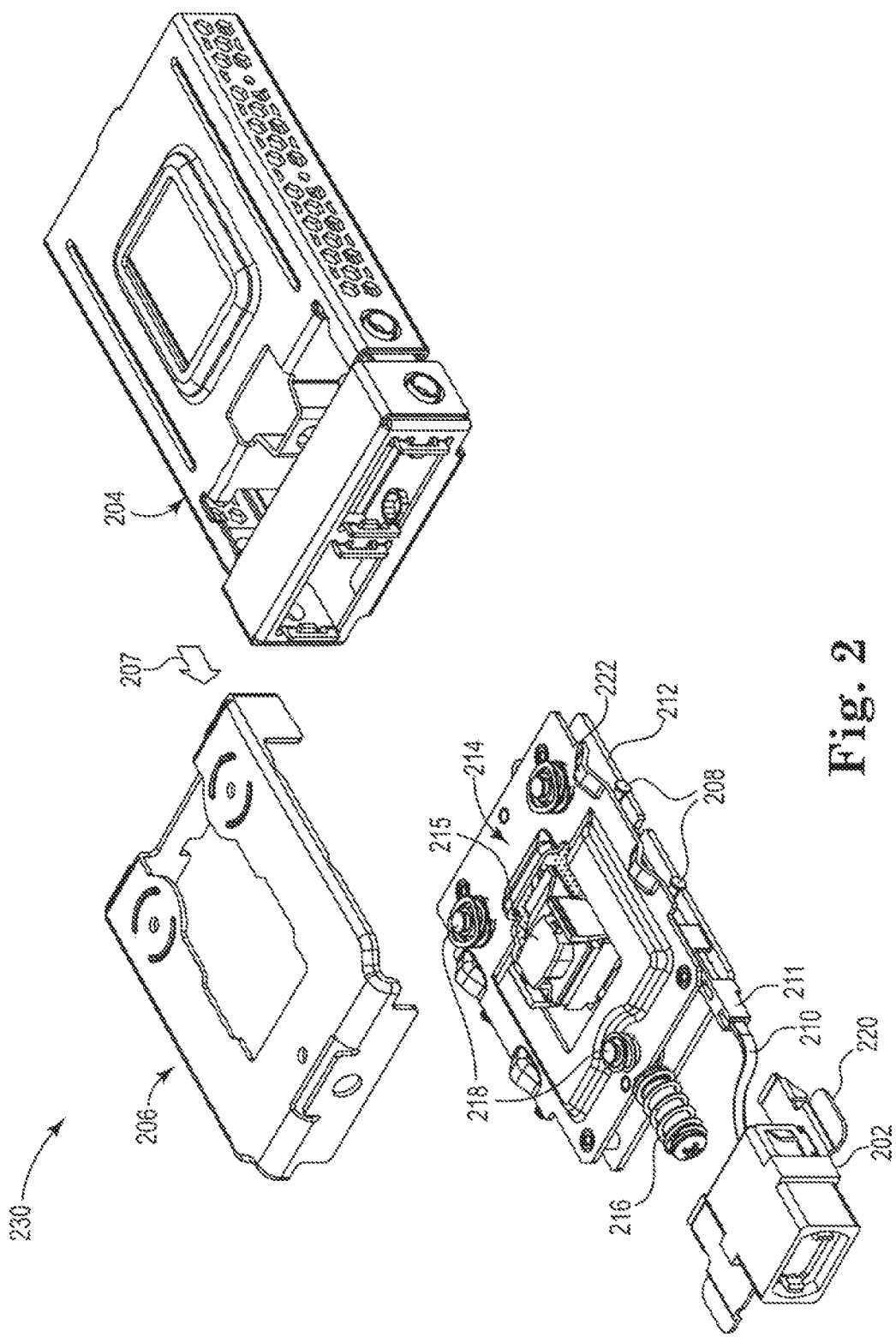
FIG. 2 illustrates a diagram of an exploded view example of a system for a module board coupling consistent with the present disclosure.

FIG. 2 illustrates a diagram of an exploded view example of a system 230 for a module board coupling consistent with the present disclosure. The system 230 can include the same or similar elements as system 100 as referenced in FIG. 1. The system 230 can be a representation of system 100 with the module bracket 206 removed. The module bracket 206 can be removed from system 230 to show the plate 214 and the grooves 222.

The system 230 can include a module frame 204 with a number of frame pins 208 that are positioned between the module board 212 and the plate 214. The frame pins 208 are shown for illustrative purposes with respect to the grooves 222. When the number of frame pins 208 are positioned below the grooves 222, a number of plate springs 218 can apply pressure to the plate 214 and lower the plate 214 and module board 212 to a system board.

In some examples, a position of the grooves 222 can be moved when pressure is applied to a back spring 216. For example, the position of the grooves 222 of the plate 214 can be moved to a position that is away from the back spring 216 when pressure is applied to position 207. In this example, the position of the grooves 222 of the plate 214 can be moved to a position that is away from the back spring 216. In these examples, the plate 214 and module board 212 can be raised when the position of the grooves 222 of the plate 214 is moved to a position away from the back spring 216 and the number of frame pins 208 are not positioned below the number of grooves 222. In these examples, the plate 214 and module board 212 can be lowered when the position of the grooves 222 of the plate 214 is moved to a position toward the back spring 216 and the number of frame pins 208 are positioned below the number of grooves 222. In some examples, a bottom portion of the module frame 204 interacts with the back of a cage to compress the back spring 216 further so that the grooves 222 can be positioned above the frame pins.

In some examples, the system 230 can utilize the back spring 216 to move the module bracket 206 within the module frame 204 in a direction that is towards and away from the back spring 216. In some examples, the number of frame pins 208 can be in contact with the plate 214 between the plate 214 and the module board 212. The back spring 216 can allow the plate 214 and module board 212 to move within the module frame 204 and allow the plate springs 218 to lower the module board 212 to a system board when the frame pins 208 are positioned below the number of grooves 222.

In some examples, the system 230 can include a latch 220 to lock the system 230 to a cage that is coupled to the system board. In some examples, the latch 220 can lock the system 230 to the cage when the module board 212 is coupled to the system board. In some examples, the latch 220 can also be utilized to remove the module board 212 from the system board. For examples, the latch 220 can be a spring loaded latch that can be depressed to remove the system 230 from the cage.

In some examples, the system 230 can include a cable manager 211. In some examples, the cable manager 211 can prevent the optical jumper 210 from becoming over extended or decoupled from the module board 212 or the optical connector 202. In some examples, an additional cable manager (not shown) can be positioned on an opposite side of the system 230 to prevent a different optical jumper 210 from being disconnected.

In some examples, the plate 214 can include an integrated heat sink. In some examples, the plate 214 can include a number of fins for dispersing heat away from the module board 212. In some examples, the plate 214 can be a molded heat sink that acts as a heat sink and a plate to couple the module board 212. In some examples, the plate can be a molded plate that is molded with the cable manager 211. That is, in some examples, the cable manager 211 and the plate 214 can comprise a single unit and the plate 214 acts as a heat sink for the module board 212.

Figure 3:
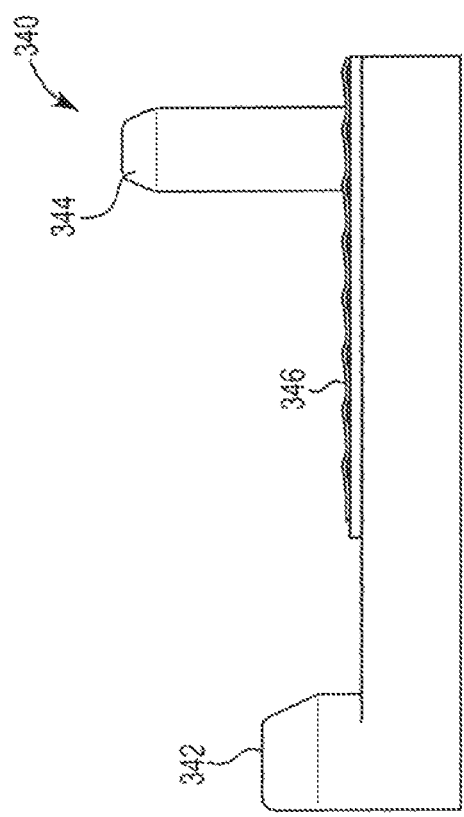
FIG. 3 illustrates a diagram of an example of a socket connector for a module board coupling consistent with the present disclosure.

FIG. 3 illustrates a diagram of an example of a socket connector 340 for a module board coupling consistent with the present disclosure. In some examples, the socket connector 340 can be utilized in combination with system 100 as referenced in FIG. 1 and/or system 230 as referenced in FIG. 2. In some examples, the socket connector 340 can be utilized to align the module board with a number of horizontal alignment features 344 and a number of vertical alignment features 342. In some examples, the number of horizontal alignment features 344 and the number of vertical alignment features 342 can align a module board within a module bracket to couple the module board to a number of electrical connections 346.

In some examples, the socket connector 340 can be coupled to a system board of a computing device. In some examples, the socket connector 340 can include electrical connections 346 that electrically couple the module board to the system board. In some examples, the electrical connections 346 can be spring contacts that can be depressed when the module board is coupled to the socket connector 340.

In some examples the horizontal alignment features 344 can be utilized to align the module board in a substantially horizontal direction with the system board and/or socket connector 340. In some examples, the horizontal alignment features 344 can be utilized to receive alignment notches of the module board. For example, a number of alignment notches can be located on the module board and the alignment notches can receive the horizontal alignment features 344 and ensure that the module board is aligned horizontally to couple to the electrical connections 346 of the socket connector 340. In some examples, the horizontal alignment features 344 can be larger than the vertical alignment features 342. For example, a height of the horizontal alignment features 344 can be greater than a height of the vertical alignment features 342.

In some examples, the vertical alignment features 344 can be a relatively smaller height compared to the horizontal alignment features 344 to allow a module board coupled to a module board coupling to pass horizontally over the vertical alignment features 344. As described further herein, the vertical alignment features 344 can be utilized to vertically align the module board when the board is lowered on to the electrical connections 346 via the module board coupling.

The socket connector 340 is a side view of a socket connector. In some examples, the socket connector 340 can include a pair of vertical alignment features 342 on each side of the socket connector 340. In some examples, the socket connector 340 can include a pair of horizontal alignment features 344 on each side of the socket connector 340.

Figure 4:
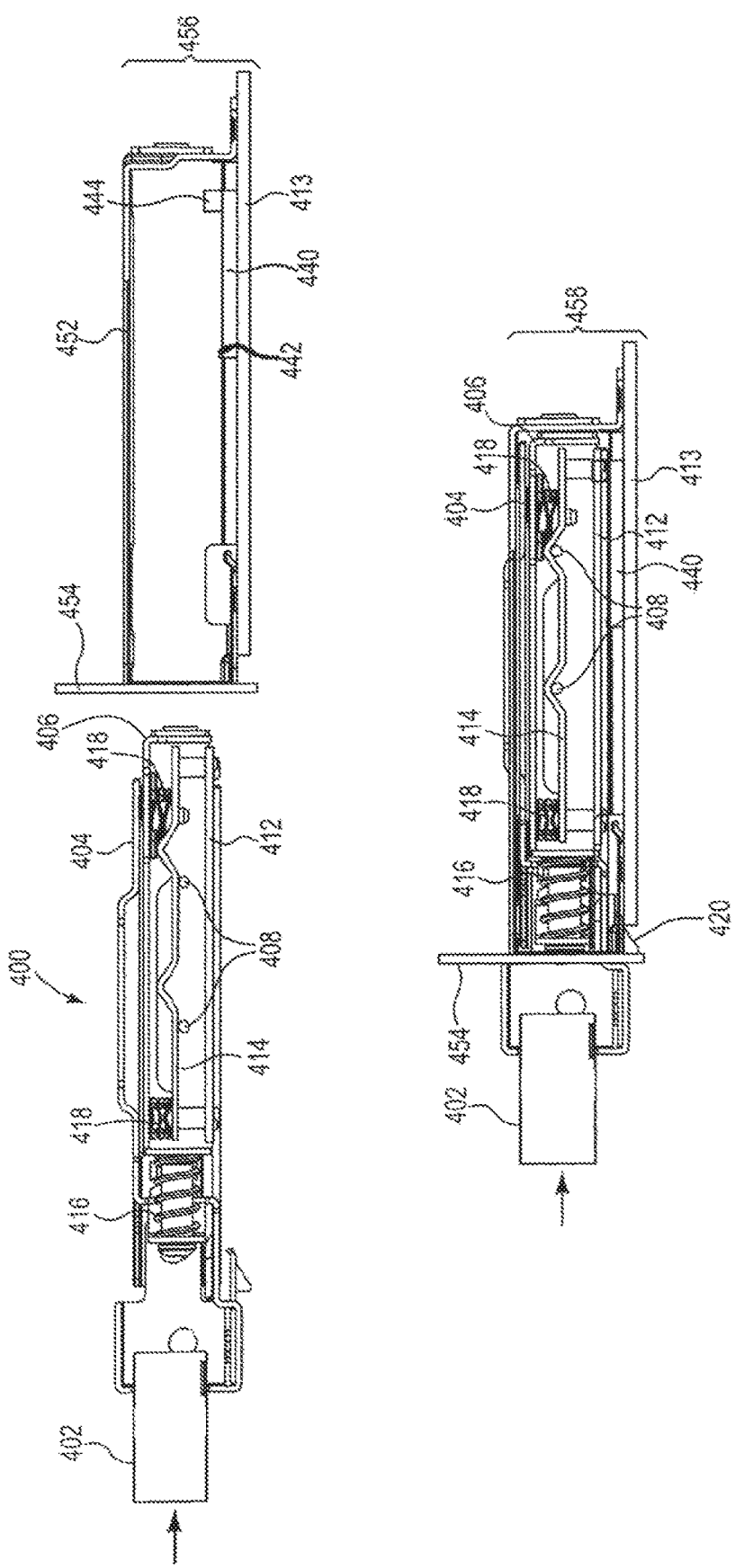
FIG. 4 illustrates a sequence of diagrams of an example of a system for a module board coupling consistent with the present disclosure.

FIG. 4 illustrates a diagram of an example of a system 450 for a module board coupling consistent with the present disclosure. The system 450 displays how a module system 400 can be horizontally inserted within a cage 452 and a module board 412 can be coupled to a system board via a socket connector.

System 450 can include a first position 456 that can represent when the module system 400 is decoupled from the system board 413. The module system 400 can be the same or similar system as system 100 referenced in FIG. 1. The module system 400 can include a module board 412, a number of frame pins 408, a plate 414, a number of plate springs 418, a back spring 416, and/or an optical connection 402.

As described herein, the number of frame pins 408 can be positioned between the module board 412 and the plate 418. At the first position 456 the module board 412 can be in a raised position since the number of frame pins 408 are not positioned below the grooves 422 of the plate 418. In some examples, the first position 456 may not include pressure being applied to the module bracket 406 or pressure being applied to the back spring 416. The number of frame pins 408 can be positioned on the plate 418 at a position that is not below the grooves 422 when pressure is not applied to the module bracket 406 or to the back spring 416. In some examples, the module board 412 can be in a raised position when the number of frame pins 408 are not positioned below the grooves 422. For example, the module board 412 can be in a raised position when the frame pins 408 are touching the plate 418 at a different position than the grooves 422.

As described herein, the number of frame pins 408 can be positioned at a location that is touching the plate 418 at a different position than the grooves 422 when the back spring 416 is in an extended position (e.g., in a position that is not depressed, etc.). In some examples, the number of frame pins 408 can be stationary and coupled to the module frame 404. In some examples, the module frame 404 can be stationary while the module bracket 406 can move from a right position to a left position via the back spring 416 as shown in FIG. 4. The grooves 422 of the plate 418 can move with the module bracket 406 when the module bracket 406 is moved from the right position to the left position. The module bracket 406 of the module system 400 can be shown in a right position at 456.

At 458, the module bracket 406 of the module system can be shown in a left position (e.g., engaged position, locked position, seated position, etc.). In some examples, the system 400 can be inserted into the cage 452. In some examples, the system 400 can pass over a vertical alignment feature 442 and interact with a horizontal alignment feature 444. As described herein, the vertical alignment feature 442 can be shorter than the horizontal alignment feature 442 to allow the system 400 to pass over the vertical alignment feature 442. In some examples, the module board 412 can interact with the horizontal alignment feature 442 as described herein. In some examples, a number of notches within the module board 412 can receive the horizontal alignment feature 442 and horizontally align the module board 412 with a number of electrical contacts of the socket connection 440.

In some examples, the module bracket 406 of the system 400 can be pressed to a back portion of the cage 452 to depress a back spring 416. As described herein, the plate 414 can be moved to a left position to position the grooves 422 above the frame pins 408 when the back spring 416 is depressed. When the plate 414 is in the left position and the grooves 422 are above the frame pins 408, the module board 412 can be lowered by pressure from the plate springs 418 to the socket connection 440.

In some examples, the system 400 can include a latch 420 that can interact with a cage plate 454. In some examples the cage plate 454 can be utilized to receive the latch 420 when the system 400 is fully inserted into the cage 452 and the module board 412 is coupled to the socket connection 440. In some examples, the latch 420 can be utilized to lock the system 400 in the cage 452 and prevent the module board 412 from being decoupled from the socket connection 440. In some examples, the latch 420 can be a spring loaded rocker latch that can be depressed to release the system 400 from the cage 452 and remove the module board 412 from the socket 440.

The system 450 can represent how a system 400 can be inserted in a substantially horizontal direction with a system board 413 to substantially vertically install a module board 412 to a system board 413. As described herein, the system 450 can be utilized as a blind mate coupling of the module board 412 to the system board 413 via a socket connection 440. In some examples, the system 450 can provide a relatively smaller quantity of space compared to previous systems and methods. By utilizing a smaller quantity of space, a greater number of module boards 412 can be utilized on a system board.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for a module board coupling, comprising:
   a module bracket coupled to a plate;
   a module board coupled to the plate;
   a number of frame pins coupled to a module frame to slide under the plate when a back spring coupled to the module bracket is depressed, wherein the module board is engaged with a socket when the number of frame pins slide under the plate; and
   a number of plate springs to push the module board to the socket when the back spring is depressed.

2. The system of claim 1, wherein the plate springs push the module board in a substantially vertical direction.

3. The system of claim 1, wherein the modular board is engaged with the socket via blind-mate alignment features.

4. The system of claim 1, comprising a cage coupled to the socket to receive the module bracket.

5. The system of claim 4, wherein the cage receives the module bracket to depress the back spring.

6. The system of claim 4, comprising a latch to lock the module bracket to the cage.

7. A module board coupling, comprising:
   a plate coupled to a module board, wherein the plate includes a number of grooves;
   a number of frame pins coupled to a module frame;
   a back spring to position the number of frame pins within the number of grooves; and
   a plate spring coupled to the plate to vertically position the module board when the number of frame pins are within the number of grooves.

8. The module board coupling of claim 7, wherein the number of frame pins are positioned between the plate and the module board.

9. The module board coupling of claim 7, wherein the module board is coupled to an optical connector that is coupled to the module bracket.

10. The module board coupling of claim 7, wherein the back spring alters a position of the plate within the module frame.

11. A system for a module board coupling, comprising:
    a module bracket comprising:
       a plate coupled to a module board, wherein the plate includes a number of grooves;
       a back spring to position a number of frame pins within the number of grooves when the module bracket interacts with a cage;
    the cage comprising:
       a socket connector to receive the module board when the number of frame pins are within the number of grooves, wherein the socket connector includes a horizontal alignment feature and a vertical alignment feature, wherein the cage depresses the back spring to move the plate to position the number of frame pins within the grooves.

12. The system of claim 11, wherein the module bracket includes a latch that interacts with the cage to secure the module bracket to the cage.

13. The system of claim 11, wherein the vertical alignment feature is shorter than the horizontal alignment feature.

* * * * *